United States Patent Office 2,971,607
Patented Feb. 14, 1961

2,971,607

METHOD FOR PURIFYING SILANE

Earl G. Caswell, Danville, Ind., assignor to Union Carbide Corporation, a corporation of New York No Drawing. Filed July 14, 1958, Ser. No. 748,162

10 Claims. (Cl. 183—114.2)

The present invention relates to a method for the purification of silane, and more particularly to the removal from silane of volatile impurities such as hydrides of arsenic, phosphorus, and boron.

Silicon metal is useful for many electronic applications, such as transistors and solar batteries, but for such specialized uses, the silicon must be of a high degree of purity.

One process for the preparation of silicon is the thermal decomposition of silane ($SiH_4$). Silicon obtained by this method, though, tends to be of poor crystalline quality and low resistivity due to impurities normally present in the silane raw material. Among the most detrimental and prevalent impurities present are the volatile compounds of arsenic, phosphorus and boron which are practically impossible to remove by distillation techniques. Silicon derived from silane containing these materials is generally unsuitable, without further treatment, for use in semi-conductor devices such as transistors, rectifiers and solar batteries.

In order to obtain silicon that has a more uniform composition and increased resistivity, thereby making it suitable for use in semi-conductor devices, a further purification of the silane prior to thermal decomposition thereof is necessary. Recrystallization is one technique commonly used for this purification. The pre-purification process, as herein disclosed, will eliminate the need for recrystallization of the silicon metal subsequent to formation thereof, in order to impart it with the desired high degree of purity.

It is therefore an object of the present invention to provide a method for obtaining silane substantially free from impurities.

It is a further object to provide a method for obtaining, substantially arsenic and phosphorus free silane, suitable for decomposition to silicon having a degree of purity which permits direct use in the preparation of silicon crystals possessing the improved properties necessary for use in semi-conductor devices.

Other aims and advantages of the invention will be apparent from the following description and appended claims.

In accordance with the present invention, a method is provided for removing certain volatile impurities, particularly hydrides of arsenic, phosphorus, and boron from silane, which comprises passing the impurities containing silane at a low temperature and reduced pressure through an adsorbent bed whereby the said impurities are separated from the silane by a method of selective adsorption.

The invention, then, contemplates the use of a porous adsorbent medium characterized by the capacity to selectively separate undesired impurities from a silane mixture by an adsorption means, and in so doing, exhibit a high rate of silane yield. While many such mediums as activated charcoal, silica gel, activated alumina and similar adsorbents might serve as a purifying medium, it has been found that the crystalline zeolitic molecular sieves, whether in natural or synthetic form, are the preferred materials for this function.

The zeolite adsorbent materials found to be most favorable for the present novel process, are the synthetic crystalline zeolites A and X, described more fully in U.S. Patent No. 2,882,243 and 2,882,244, both of R. M. Milton, issued April 14, 1959. These materials are metal aluminum silicates having a three-dimensional structure with controlled pore size. These synthetic zeolites are clearly distinguishable from natural occurring zeolites due to their chemical composition and crystalline structure as determined by X-ray diffraction patterns.

The zeolite materials, both natural and synthetic, mentioned above have unique adsorptive properties both as to selectivity and capacity. Their particular crystalline structures offer large surface areas for adsorption, their controlled pore sizes also allow an adsorptive selectivity based on size of molecules being treated, and the nature of the crystalline zeolite molecular sieves also results in selective adsorption based on the relative polarity of the adsorbed molecules. The particular adsorbent purification mechanism of the present invention is not intended, and should not be limited, by any of the above theories of operation of certain preferred adsorbent materials.

The temperature at which the invented process is performed is dependent primarily on the adsorption characteristics of the adsorbent utilized, but a preference for a reduced temperature of operation is dictated by two factors. Primarily, crystalline zeolite molecular sieves function with greater efficiency at low temperature. Secondly, a reduced temperature tends to maintain the vapor pressure of silane and thus the internal pressure of the system at a relatively low value. The process may be most satisfactorily performed at temperatures below 0° C., but preferred operation is within the temperature range of between −50° C. and −100° C.

In order to minimize the amount of silane which will be adsorbed by the zeolite during the process, a reduced pressure, preferably below atmospheric, is desirable in the adsorbing chamber.

Since silane is spontaneously flammable in the presence of oxygen, and also to remove any non-condensable impurities which may interfere with the subsequent silane purification process, it is of the utmost importance to completely evacuate the purification system before the introduction of silane.

In the following example, illustrative of the novel process, a quantity of silane in an unpurified condition was treated with a synthetic zeolite adsorbent at reduced temperature and pressure to remove certain volatile impurities.

The apparatus used comprises essentially directly connected in series a storage vessel for storing unpurified silane under pressure, an adsorbent trap maintained at reduced temperature and reduced internal pressure, and a storage vessel for purified silane.

The unpurified silane storage vessel was maintained at about −78° C. by means of a surrounding solid carbon dioxide bath. Under these conditions, the contained silane has a vapor pressure of at least 75 p.s.i.g., and the vapor can thus be readily removed from the vessel for treatment. About 2.2 gram-moles (72 grams) of silane, said amount determined from pressure-volume relationship of the storage vessel, and by flow rate data, was passed in the vapor phase from the storage vessel at a rate of about 15 liters per hour through two adsorption traps maintained in series. These traps each consisted of a glass U tube, 1 inch in diameter and 20 inches in length, having suitable inlet and outlet connections, and provided with about 125 grams of sodium zeolite A (4 x 8 mesh) adsorbent. Two adsorbent traps were conveniently used in series to insure complete adsorption of the impurities.

A large single adsorbent bed or several smaller beds could also be used if desired. The adsorption traps were maintained at about −78° C. by means of an external solid carbon dioxide bath.

The purified silane storage vessel and the adsorption traps, after complete evacuation, were connected to a vacuum pump which maintained a pressure of about 8–16 mm. mercury in the traps. Under the above conditions of temperature and pressure, only a negligible amount of silane is adsorbed by the zeolite. Gaseous silane flow through the system was maintained by a combination of high pressure in the unpurified silane storage vessel, and reduced pressure in the adsorption traps and purified silane storage vessel. The gaseous silane which passed through the adsorption traps was then collected as a solid in the purified silane stainless steel storage vessel maintained at −195° C. by means of liquid nitrogen refrigerant.

The silane is conveniently and preferably treated in the gaseous form, but liquid silane could also undergo adsorbent purification if so desired.

The purified silane, treated as described above, was then removed from the storage vessel, thermally decomposed to elemental silicon, melted, and crystallized by pulling a crystal from the melt. The crystal product was P-type with a resistivity of 40–75 ohm-cm. The high resistivity of this crystal product indicates substantial removal of impurities. The P-type condition of the product indicates substantial removal of N-type impurities, such as compounds of arsenic and phosphorus. This product could be used without further purification treatment in the fabrication of semi-conductor devices such as transistors, rectifiers and solar batteries.

This is a vast improvement over silicon crystals drawn from silicon obtained from thermal decomposition of unpurified silane which have a resistivity in the order of 2–25 ohm-cm., indicative of an impurity level too high for direct commercial use without further purification.

What is claimed is:

1. A method for selectively removing volatile impurities such as hydrides of arsenic, phosphorus and boron from silane which comprises treating impurity-containing silane with a crystalline zeolitic molecular sieve, and selectively adsorbing said volatile impurities into said molecular sieve.

2. A method substantially as described in claim 1 wherein the crystalline zeolite is selected from the group consisting of synthetic zeolites A and X.

3. A method for selectively removing volatile impurities such as hydrides of arsenic, phosphorus and boron from silane which comprises treating impurity-containing silane with a crystalline zeolitic molecular sieve at a temperature below 0° C. and at subatmospheric pressure, and selectively adsorbing said volatile impurities into said molecular sieve.

4. A method for selectively removing volatile impurities such as hydrides of arsenic, phosphorus and boron from silane which comprises treating impurity-containing silane with a crystalline zeolitic molecular sieve at a temperature between −50° C. and −100° C. and at sub-atmospheric pressure, and selectively adsorbing said volatile impurities into said molecular sieve.

5. A method for selectively removing impurities of arsenic, phosphorus and boron from silane which comprises passing impurity-containing silane fluid through a crystalline zeolitic molecular sieve in an oxygen free atmosphere, maintained at a temperature not exceeding zero degrees centigrade and at a sub-atmospheric pressure whereby impurities of arsenic, boron and phosphorus are substantially and selectively adsorbed by the said molecular sieve.

6. A method substantially as described in claim 5 wherein the crystalline zeolite molecular sieve is zeolite A.

7. A method substantially as described in claim 5 wherein the crystalline zeolite molecular sieve is maintained at a temperature not exceeding −50 degrees centigrade.

8. A method for selectively removing impurities of arsenic, phosphorus, and boron from silane which comprises passing impurity-containing silane fluid through a pair of successively disposed adsorbent traps containing crystalline molecular sieves comprising synthetic sodium zeolite A and maintaining said traps in a substantially oxygen free atmosphere and at a temperature within the range of from −50 degrees to −100 degrees centigrade and at a pressure within the range of from 8 to 16 millimeters of mercury whereby said impurities are selectively adsorbed.

9. A method substantially as described in claim 8 wherein the adsorbent traps contain synthetic sodium zeolite X.

10. A method substantially as described in claim 5 where the crystalline zeolitic molecular sieve is zeolite X.

References Cited in the file of this patent
UNITED STATES PATENTS
2,306,610   Barrer _____ Dec. 29, 1942